2 Sheets—Sheet 1.
H. H. DOTY.
LAMPS.
No. 7,867. Reissued Aug. 28, 1877.
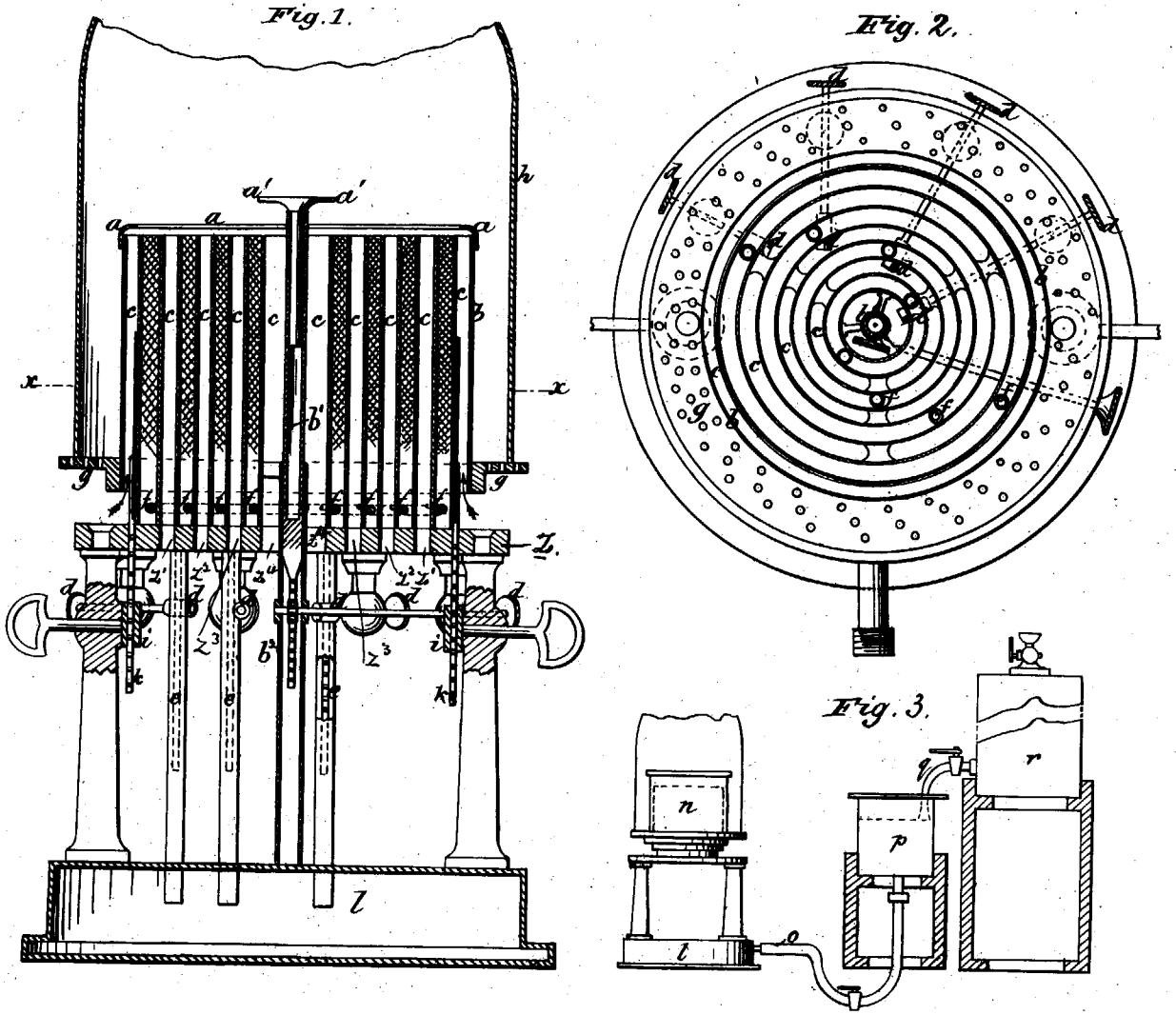
Witnesses.
E. E. Masson
Chas. G. Page
Inventor
Henry Harrison Doty
N. PETERS, PHOTO-LITHOGRAPHER, WASHINGTON, D. C.

2 Sheets—Sheet 2.
H. H. DOTY.
LAMPS.
No. 7,867. Reissued Aug. 28, 1877.
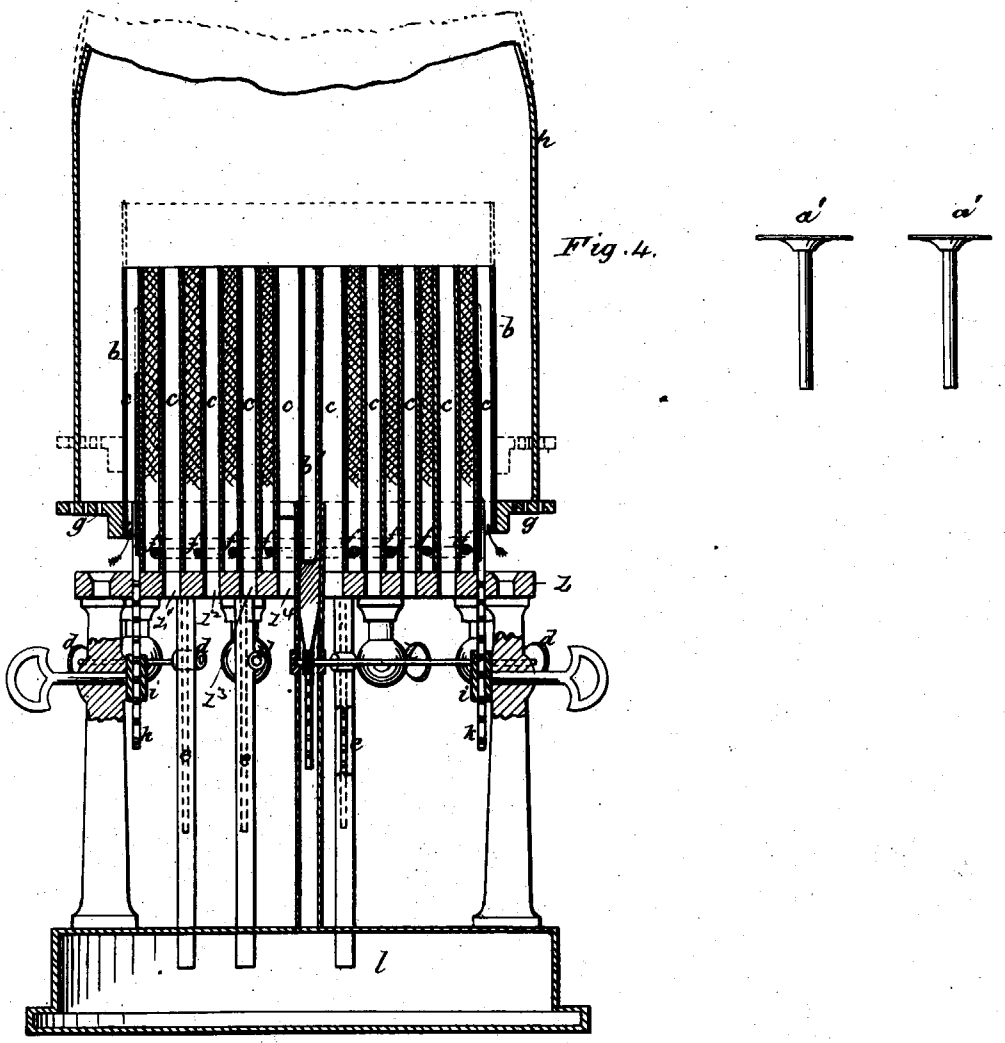
Witnesses:
E. E. Masson
Chas. H. Page
Inventor:
Henry Harrison Doty
N. PETERS, PHOTO-LITHOGRAPHER, WASHINGTON, D. C.

UNITED STATES PATENT OFFICE.

HENRY HARRISON DOTY, OF NORFOLK, VIRGINIA.

IMPROVEMENT IN LAMPS.

Specification forming part of Letters Patent No. 109,303, dated November 15, 1870; Reissue No. 7,165, dated June 6, 1876; Reissue No. 7,867, dated August 28, 1877; application filed March 28, 1877.

*To all whom it may concern:*

Be it known that I, HENRY HARRISON DOTY, of Norfolk, in the State of Virginia, have invented new and useful improvements in means and apparatus for producing the more complete combustion of paraffine and other hydrocarbon oils, and for which, in whole or in part, I have obtained patents abroad, namely, an English patent, sealed September 25, 1868, No. 1,098, a French patent, dated September 30, 1868, No. 82,617, and a Belgian patent, dated October, 1868, No. 24,349; and I do hereby declare that the following is a clear, full, and exact description thereof, reference being had to the accompanying drawings, and to the letters of reference marked thereon.

This invention relates to a lamp for producing the more complete combustion of paraffine and other hydrocarbon oils; and consists in combining air-conducting cylinders with the wick-holder in concentric circular Fresnel burners, and with an adjustable perforated bracket or chimney-holder, located outside the external cylinder or air-jacket, constructed in such a manner as to suppress or prevent too great a current of air from passing up next to the chimney, and permit an easy lateral adjustment of the chimney, thus correcting defects in concentric burners as heretofore constructed, my improved construction serving to practically equalize the current of air, so that it will impinge with about equal force upon all parts of the flame at and above the point of ignition, producing greater intensity, brilliancy, whiteness, and increased illuminating power from a given consumption of fluid, caused by an increased consumption of oxygen or air in proportion to the amount of oil consumed than ever hitherto produced by any kind or size of burner, so far as I am aware.

A series of tubes of different diameters, corresponding with the number of burners, is arranged vertically, one tube within the other, and uniformly brazed or soldered at the lower end to a plate or disk, *z*, and the adjustable button or disk *a'*, hereinafter referred to, affords a means for accurate adjustment, to supply a proper and exact amount of air to the inner wick; and this central button is removable as well as adjustable.

It will be observed that the central rod $b^1$, and its supporting-tube $b^2$, which is larger in diameter than said rod $b^1$, compel an annular current of air which is approximate in relative area to the air-spaces for the other wicks—that is, proportionately to the size of the other wick-tubes or wicks.

Double-flanged rings may be employed one for each annular air-space surrounding the wick, and when so employed each ring is placed on top of a removable tube or cylinder, such cylinders being raised and lowered by a screw and pinion, or any other well-known means. These cylinders and the flanged rings may be dispensed with when desired.

For heavy hydrocarbons or fatty oils, which are richer in carbon than the light hydrocarbons, and require a greater quantity of oxygen to be forced into the flame for their combustion, I employ the ring on the top of the outer cylinder, which forces the current of air passing up through the burner next to the outer cylinder to impinge more immediately upon the flame, and I also place the central disk or button within its support, as shown in Fig. 1, in order that the central current of air may then be forced more directly into the inner flame, which is the most sensitive, and bears important relations to all the others as to steadiness in a concentric burner; and this inner flame is also important, as it is the luminous center of the flames as a whole, and in practice is adjusted to the axis of the illuminating apparatus; and by these two outer and inner currents thus combined, there can be, by means of the valve employed in the pipe above the chimney in all light-houses, a sufficient quantity of oxygen forced up through the burner for the combustion of the heaviest oils ever used for light-house illumination.

A chimney gallery or bracket encircles the outer cylinder, and it has perforations for the admission of a limited supply of air to pass up through the space between the chimney and the outer cylinder. The object of this diminished outer current is threefold, namely, first, to prevent a peculiar deposition of bluish matter incident to the combustion of mineral oils upon the inner surface of the lamp-glass, which produces an opacity of the glass and intercepts the actinic rays or penetrative power of the light; second, this outer limited current of air, passing up next to the chimney, tends to keep the base of the chimney cool enough to be taken off by the hands in case of breakage, so that another may be substituted without delay, and to prevent any perceptible irregularity in the distinctive character of the light as a danger-signal; and, third, it supplies air to the outer flame, at a comparatively elevated point, which compensates for the proportionately small supply admitted between the outer wick-tube and its surrounding air-jacket or cylinder.

The upper surface of this chimney-bracket, upon which the chimney rests, admits of the chimney being moved or adjusted laterally, which operation bears an important relation to the air-supply and the consequent uniformity of the flame, inasmuch as the flame or flames in a concentric mineral-oil burner not unfrequently during long night-service, will become forked, or throw up smoky points, to reduce which the wick in a burner in a fixed chimney would have to be slightly lowered, which operation sometimes loosens the charred part of the wick, and causes great irregularity and diminished brilliancy of the flame; whereas, with the provision for lateral adjustment of the chimney, by a slight movement of the same in one direction or the other these points of smoky flame may be instantly subdued, thus preventing unconsumed carbon, in the form of soot, from passing up through the chimney and pipe and falling upon the lenses and prisms of the optical apparatus and obstructing the transmission of rays of light.

The burner-supporting plate or disk $z$ is itself supported on columns (or otherwise) resting on a receptacle for containing a supply of oil, the communication therefrom to the burners being through small tubes, some of which may contain the racks for raising and lowering the wicks.

The plate or disk $z$ is provided with a series of concentric openings or passages, $z^1$ $z^2$ $z^3$, &c., for admitting air to the several air-spaces between the concentric wick-tubes, and also with a central circular opening, $z^4$. These concentric passages are, as nearly as practicable, equal in width, so that the air admitted by them through the plate for the supply of the several wicks may be substantially equal in proportion to the diameters of the several wick-tubes.

The central opening $z^4$ has its inlet for air brought to a size or breadth nearly equal to that of the annular spaces $z^1$ $z^2$ $z^3$ by the supporting-tube $b^2$, before named, which, as stated, is of greater diameter than the central rod $b^1$. It will thus be evident that no more air can be admitted into the spaces between these wick-tubes than the equalized openings in the plate $z$ will allow, and that the adjustment of the central deflector or button $a'$ permits a control of this amount with reference to the supply of air to the inner side of the inner wick, and that by lowering such button such supply may be reduced to any required degree, even to a degree proportionally less than that of the other air-spaces, or may be made relatively equal to them, or may, by raising the button, be made somewhat greater.

Buttons of different diameters may be employed, but applied to the central rod in the same manner as above stated, and the substitution for one button of another of different size also permits the adjustment and control of the central annular air-current, not only for the purpose of equalizing such current with reference to that of the other air-passages, but also for the purpose of varying the lateral deflection of such current at its exit near the wick.

The receptacle above mentioned communicates with a receiver by means of a copper or other tube, having a cock at its lowest part for emptying it of its contents when required, which said tube may be carried under the lenses of the light-house, (when my invention is used for that purpose,) so that the receiver and the air-tight reservoir from which the receiver is supplied may be placed outside the lenses. The said receiver is placed at a convenient height for the plentiful supply of oil to the burners, and is self-regulated by means of a cock in the air-tight reservoir, so that as soon as the oil in the receiver reaches the mouth of the cock the flow ceases, there being no pressure of air on the top of the liquid in the reservoir, to which the oil is fed by means of a suitable cock placed thereon.

In order that my invention may be more clearly understood, I will describe the same with reference to the accompanying drawings, in which—

Figure 1 is a vertical section through the center of the lamp; Fig. 2, a horizontal section of the lamp taken in the line $x$ $x$ of Fig. 1, the glass being removed; Fig. 3, a view on a reduced scale, showing the general relative arrangement of the lamp, receiver, and reservoir; and Fig. 4, a vertical section with the flanged rings omitted, and the outer jacket, as shown in dotted lines, raised a little above the top of the wick-case.

A flanged ring for guiding or deflecting the air to the flame is shown at $a$ in Fig. 1. It is supported on the outer air-cylinder $b$, and is removable at will, and this outer cylinder is connected to a sleeve, by which it may be applied to the outer wick-tube. This outer cylinder $b$ may be lowered to a level with, or a little below, the outer wick-tube. $d$ $d$, &c., are the pinions, and $e$ $e$ the racks for raising and lowering the wick-holders $f$.

The perforated bracket for carrying the chimney is shown at $g$, and the chimney at $h$. The bracket (and the chimney, also, when in its place on the bracket) is raised and lowered by the pinion $i$ and rack $k$.

The central disk-deflector is shown at $a'$, and its shank is supported upon a central rod, $b^1$, which, throughout a portion of its length, is of tubular form, to admit the shank of the central deflector or button $a'$, this disk being supported within or upon said rod, and the rod itself being vertically adjustable by means of a rack and pinion. This deflector $a'$ is also removable at will.

The receptacle for the fluid is shown at $l$, and by reference to Fig. 3 it will be seen that it can be connected with and supplied from the receiver $p$ through a copper or other tube, $o$, this receiver $p$ being itself supplied from the receiver $r$ by means of a cock, $q$.

My construction not only permits the employment of mineral oils in light-houses—a result hitherto found impracticable and impossible by any known means, so far as I am aware; but, at the same time, increases the illuminating power of all oils as illuminants, and with a very material economy.

I am aware that in a single-wick burner an outer air-deflector has been used, capable of being raised, but not capable of being lowered down to or below the level of the top of the wick-tube. Such a device I do not claim.

Having now described the nature and particulars of my invention, what I claim is—

1. A burner for hydrocarbon oils having two or more concentric annular wicks, and provided with air-spaces and means of air-supply and of deflection or modification of the air-currents which pass through them, substantially as described, whereby the air is admitted and delivered at the several points of combustion in substantially uniform volume, as and for the purpose set forth.

2. A burner adapted for two or more concentric wicks, and having a vertically-adjustable air-jacket or cylinder surrounding the outer wick-case, in combination with a bracket or chimney-gallery constructed and perforated substantially as shown.

3. A concentric burner having a vertically-adjustable outer air-jacket or cylinder, surmounted with a removable flanged ring, substantially as shown and described.

4. A burner adapted for two or more concentric wicks, and having an adjustable outer cylinder or air-jacket, with or without the flanged ring, combined with an internal rod or closed tube, and a bracket constructed and perforated substantially as shown, as and for the purposes set forth.

5. A burner adapted for two or more concentric wicks, and having an adjustable outer cylinder or air-jacket, with or without the flanged ring, combined with a central rod and disk or deflector, and with a bracket constructed and perforated substantially as shown, and for the purposes set forth.

6. An adjustable chimney-bracket outside the air-jacket, perforated to afford provision for a limited supply of air next to the lamp-glass, and also adapted to admit of the lateral adjustment of the chimney, substantially as shown and described.

7. Two or more concentric annular wick-tubes; air-spaces of substantially equal diameter inside and outside of the wick-tubes, which surround the central or innermost one; a central air-passage having a vertically-adjustable rod arranged centrally within it, and provided at its top with a detachable deflecting-disk, and an outer vertically-adjustable air-jacket or deflector having at its top a detachable ring, which is provided with an inwardly-projecting flange, combined substantially in the manner described, to constitute a lamp-burner for hydrocarbon oils.

8. The combination, in a lamp-burner for hydrocarbon oils, of a central wick-tube encircling an air-passage, which has within it a vertically-adjustable rod which is adapted, substantially as described, to support a horizontal deflecting disk, one or more annular, concentric wick-tubes encircling the central wick-tube and separated from it and from each other by annular air-spaces of substantially equal diameter, and an outer vertically-adjustable cylinder, to which is attached a perforated gallery, and which incloses an air-space outside the outermost wick-tube, substantially as shown and described.

HENRY HARRISON DOTY.

Witnesses:

W. R. EDELEN,

PENNINGTON HALSTED.